Oct. 14, 1924.

H. BIRKHOLZ, SR 1,511,702

FLEXIBLE COUPLING

Filed Aug. 20, 1921

INVENTOR.

BY Hans Birkholz Sr.

Morsell + Keeney,

ATTORNEYS.

Oct. 14, 1924.

H. BIRKHOLZ, SR
FLEXIBLE COUPLING
Filed Aug. 20, 1921

INVENTOR.
Hans Birkholz Sr.
BY Morsell + Keeney
ATTORNEYS.

Patented Oct. 14, 1924.

1,511,702

UNITED STATES PATENT OFFICE.

HANS BIRKHOLZ, SR., OF MILWAUKEE, WISCONSIN.

FLEXIBLE COUPLING.

Application filed August 20, 1921. Serial No. 493,901.

*To all whom it may concern:*

Be it known that I, HANS BIRKHOLZ, Sr., a citizen of the United States, and resident of Milwaukee, in the county of Milwaukee and State of Wisconsin, have invented new and useful Improvements in Flexible Couplings, of which the following is a description, reference being had to the accompanying drawings, which are a part of this specification.

This invention relates to improvements in flexible couplings of that type more particularly adapted for connecting shafts which are slightly out of axial alinement.

It is one of the objects of the present invention to provide a flexible coupling which will serve to transmit power from one shaft to another when said shafts are more or less out of axial alinement with relation to each other.

A further object of the invention is to provide a flexible coupling which is also adapted to take care of expansion and end play, as in direct connected motors and other machines and also to insure self-alinement and prevent unequal wear of bearings and therefore eliminate loss of power by undue friction.

A further object of the invention is to provide a flexible coupling in which the angular velocities of shafts connected together by the coupling are equal to each other at every instant.

A further object of the invention is to provide a flexible coupling in which the power will be transmitted from one portion of the coupling to another at a plurality of points in order to equalize the strain.

A further object of the invention is to provide a flexible coupling in which an intermediate member is positioned between and flexibly connected to two outer members at a plurality of points.

A further object of the invention is to provide a flexible coupling in which wearing parts may be easily replaced and in which the parts are strong and durable and well adapted for the purpose described.

A further object of the invention is to provide adjustable means for spreading the intermediate means so as to take up lost motion due to wear of the parts, which adjustable means may if desired be made yieldable to provide a smoother running coupling.

A further object of the invention is to provide a coupling of such construction that it may be readily adjusted and balanced which is particularly desirable when the coupling is rotated at a relatively high speed.

The invention consists in the novel constructions and arrangements to be hereinafter described and claimed for carrying out the above stated objects and such other objects as will appear from the following description of certain preferred embodiments illustrated in the accompanying drawings, wherein—

Like characters of reference designate like parts in the several views.

Figure 1:
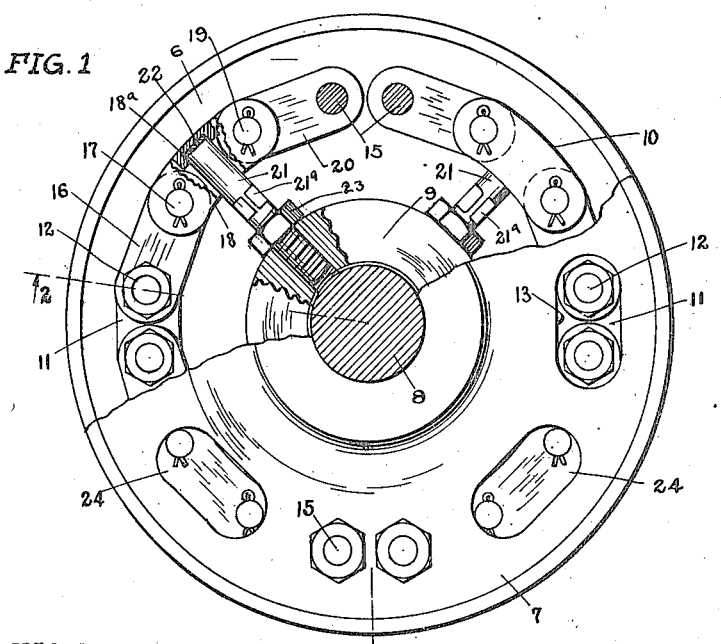
Fig. 1 is an elevational view of a coupler embodying certain principles of the invention, certain portions thereof being broken away to reveal more clearly the internal construction thereof.
Figure 2:
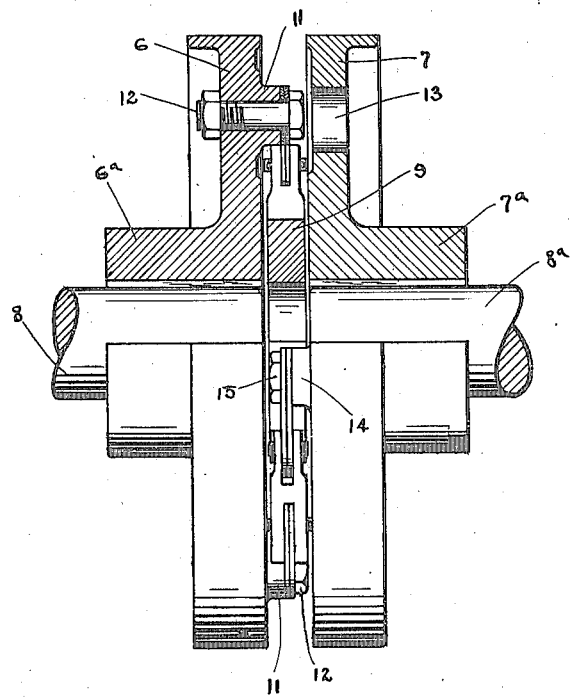
Fig. 2 is a partial sectional and elevational view of the coupling taken on the line 2—2 of Fig. 1.

Referring first to Figs. 1 and 2 of the drawings, it will be seen that the coupler comprises flanged members 6 and 7 provided with hub portions 6ª and 7ª, respectively, which are keyed on the adjacent ends of the shafts 8 and 8ª, respectively, the latter being in substantial axial alignment, a floating member 9 interposed between the adjacent ends of the two shafts and the coupling members 6 and 7 and connected to a flexible intermediate member, designated as a whole by the reference character 10, which is also connected to the two coupling members.

The coupling member 6 is provided with two oppositely disposed bosses 11 each of which is provided with perforations for the reception of bolts 12, the coupling member 7 being provided with apertures 13 opposite the bosses 11 to permit positioning the bolts 12 and holding them against rotative movement while the nuts are being tightened. Likewise the coupling member 7 is provided with two oppositely disposed bosses 14, only one of which may be seen in Fig. 2, which are perforated for the insertion of bolts 15, the coupling 6 being provided with apertures 13, which are hidden from view and which are for the same purpose as those provided in the member 7. The bosses 11—11 on the member 6 and the bosses 14—14 on the member 7 are so arranged that, if lines were drawn therethrough, respectively, they would be substantially at right angles to each other when the members 6 and 7 are mounted on their respective shafts.

The coupling members 6 and 7 are flexibly connected to each other through the interposition of the flexible ring member 10 consisting of a plurality of links, each quadrant of the ring comprising a link 16 pivotally connected at one end to the member 6 by one of the bolts 12 and at the other end by a pin 17 to one side of a knuckle member 18, the opposite side of the knuckle member being pivotally connected by a pin 19 to the adjacent end of a link 20, the opposite end of which is connected to the coupling member 7 by one of the bolts 15. The knuckle members 18 are formed with inner radially extending recesses 18$^a$ which are adapted to receive the outer ends of radially extending studs 21, the inner ends of which have threaded engagement with the floating member 9. Steel wear plates 22 are preferably interposed between the outer ends of the studs 21 and the bottoms of the recesses 18$^a$, respectively. Each of the studs 21 is provided with a squared portion 21$^a$ so that the stud may be screwed into or out of the member 10, it being locked in the desired position by a nut 23. The flanged member 7 is provided with apertures 24 opposite the studs 21 so that a tool may be inserted therethrough to adjust the studs and to turn the nuts 23. It will be apparent, therefore, that the studs 21 may be adjusted as desired to spread the flexible ring 10.

When the shafts are in axial alignment, the arrangement is such that a center line drawn through the bosses 11 of the coupling member 6 will be exactly at right angles to a similar line drawn through the bosses 14 of the coupling member 7, the floating member 9, in that case, being adjusted by the spreading studs 21 to run centrally, that is to say, in axial alignment with the two shafts. The coupling is flexible in every direction either in a vertical or a horizontal direction, or in a resultant direction thereof. The angular velocities of the two shafts remain the same even though the shafts are somewhat out of alignment. The coupling is particularly adapted to the elimination or absorption of side play and oscillatory or other vibratory movements which frequently develop in the driving shaft particularly at high speeds and which with ordinary couplers are transmitted to the driven shaft. By adjusting or shifting the position of the floating member relative to the other parts of the coupler, it may be readily balanced for any rotative speed, consequently, the loss of power is negligible even though the shafts are appreciably out of alignment and considerable vibration is developed in the driving shaft. The adjustable studs 21 also permit the flexible ring member 10 to be maintained at the desired tension and to take up any lost motion that may develop therein due to wearing away of the parts.

Figure 3:
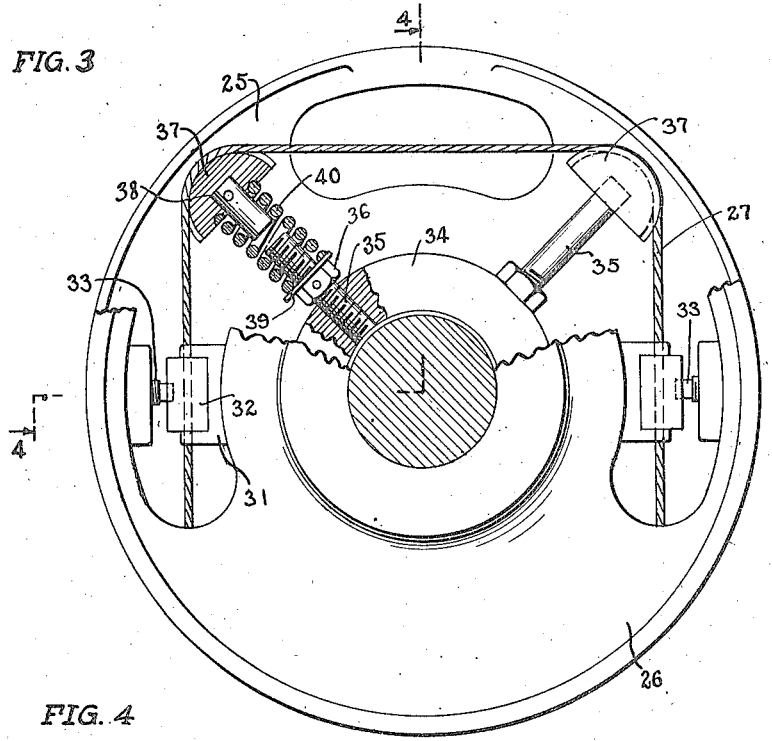
Fig. 3 is an elevational view of a coupler of modified construction, certain portions being broken away to reveal more clearly the internal construction thereof.
Figure 4:
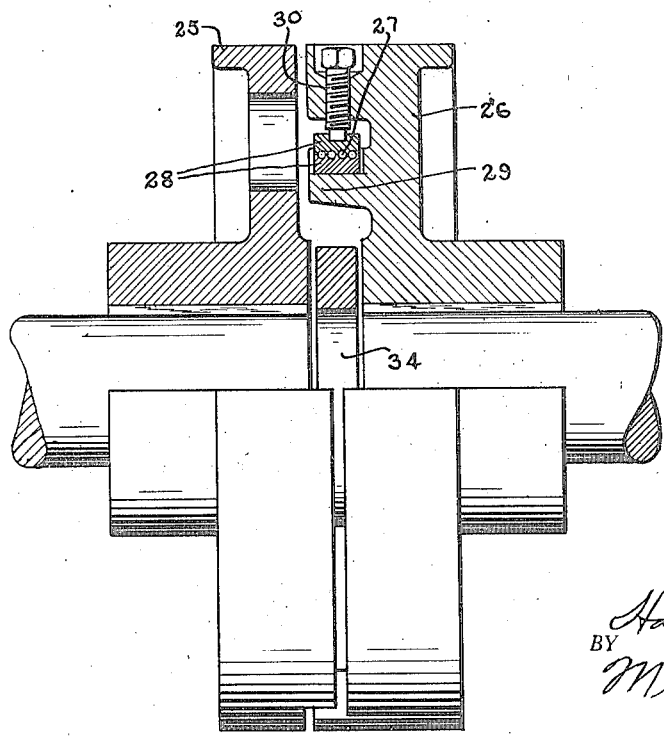
Fig. 4 is a sectional and elevational view of the modified coupler taken on the line 4—4 of Fig. 3.

Referring now to the modification shown in Figs. 3 and 4, it will be seen that the construction is substantially the same as that just described except that the coupling members 25 and 26 are connected to a flexible intermediate ring member consisting of a series of closely arranged parallelly extending flexible cables 27 and also that yieldable connections are provided between the floating member and the ring member.

The cable members run through two oppositely arranged clamping devices each consisting of a pair of co-operating blocks 28 which are clamped against laterally extending lugs 29, formed on the coupling member 26, by set screws 30 carried by said coupling member. The coupling member 25 is also provided with two oppositely arranged laterally extending lugs 31 against which similar cable holding devices 32 are clamped by set screws 33 carried by the coupling member 25. The coupling members are keyed on the respective shafts in such a manner that a center line extending through the lugs 29 of the coupling member 26 will be substantially at right angles to a similar line drawn through the lugs 31 of the coupling member 25.

The floating member 34, which is interposed between the two coupling members, carries four equi-spaced radially extending threaded studs 35 which may be locked in the desired position relative thereto by nuts 36, the floating member being so positioned that the studs 35 are positioned medially between the clamping devices 28 and 32, respectively. Four cable engaging members 37 which in one form may be provided with studs 38 are disposed opposite the radially extending studs 35. Washers 39 are positioned on the outer ends of the studs 35 and rest on top of the respective nuts 36, and relatively stiff coiled compression springs 40 are placed over the studs 38 and the outer ends of the studs 35. By proper adjustment of the studs 35 and nuts 36 the cable members may be maintained at the desired tension and the floating member 34 also maintained in a position to balance the coupling.

If desired, in this form of the invention the springs 40 may be omitted and the studs 35ª connected directly to the cable engaging members 37, as shown at the right hand side of Fig. 3.

I claim:

1. A coupling of the class described comprising two spaced members adapted to be fixed to two substantially aligned shafts, respectively, a flexible ring interposed between and directly connected to each of said members, a floating element interposed between said members, and a radially extending stud carried by said floating member and adjustable longitudinally of its own axis for varying the tension of said ring.

2. A coupling of the class described comprising two spaced members adapted to be fixed to two substantially aligned shafts, respectively, a flexible ring interposed between and directly connected to each of said members, a floating element interposed between said members, and a radially extending stud threaded into said floating member and provided with means whereby it may be adjusted longitudinally of its own axis to vary the tension of said ring.

3. A coupling of the class described comprising two spaced members adapted to be fixed to two substantially aligned shafts, respectively, a flexible ring interposed between and directly connected to each of said members, a floating element interposed between said members, and a plurality of adjustable studs connecting said element with said flexible ring for the purpose described.

4. A coupling of the class described comprising two spaced members adapted to be fixed to two substantially aligned shafts, respectively, a flexible element interposed between and directly connected to each of said members, a floating element interposed between said members, and a plurality of adjustable radially extending members carried by one of said elements and bearing against the other of said elements for the purpose described.

5. A coupling of the class described comprising two spaced members adapted to be fixed to two substantially aligned shafts, respectively, a flexible element interposed between said members, means positively connecting said element to said respective members, the connections between said element and one of said members being substantially medial of the connections between said element and the other of said members, a floating element interposed between said members, and means connecting said flexible element, at points intermediate its connections with said members, to said floating element for the purpose described.

6. A coupling of the class described comprising two spaced members adapted to be fixed to two substantially aligned shafts, respectively, a flexible element comprising a plurality of links, means positively connecting said element to said respective members, the connections between said element and one of said members being substantially medial of the connections between said element and the other of said members, a floating element interposed between said members, and means connecting said flexible element, at points intermediate its connections with said members, to said floating element, for the purpose described.

7. A coupling of the class described comprising two spaced members adapted to be fixed to two substantially aligned shafts, respectively, a flexible element comprising a plurality of links arranged in quadrants, means connecting each quadrant at one end to one of said members and at the other end to the other of said members, a floating element interposed between said members, and radially extending adjustable studs carried by said floating element and bearing against the medial portions of said quadrants, respectively, for the purpose described.

In testimony whereof, I affix my signature.

HANS BIRKHOLZ, Sr.